United States Patent
Gaebler

(10) Patent No.: US 9,132,370 B2
(45) Date of Patent: Sep. 15, 2015

(54) DROPLET PRECIPITATOR

(75) Inventor: Ansor Gaebler, Constance (DE)

(73) Assignee: SULZER CHEMTECH AG, Winterthur (CH)

(*) Notice: Subject to any disclaimer, the term of this patent is extended or adjusted under 35 U.S.C. 154(b) by 0 days.

(21) Appl. No.: 13/877,321

(22) PCT Filed: Sep. 6, 2011

(86) PCT No.: PCT/EP2011/065386
§ 371 (c)(1),
(2), (4) Date: Sep. 9, 2013

(87) PCT Pub. No.: WO2012/041665
PCT Pub. Date: Apr. 5, 2012

(65) Prior Publication Data
US 2014/0007770 A1 Jan. 9, 2014

(30) Foreign Application Priority Data
Sep. 30, 2010 (EP) .................... 10183928

(51) Int. Cl.
*B01D 45/00* (2006.01)
*B01D 45/08* (2006.01)
*B01D 50/00* (2006.01)
*B01D 45/12* (2006.01)
*B01D 45/06* (2006.01)
*B29C 65/00* (2006.01)

(52) U.S. Cl.
CPC ............... *B01D 45/08* (2013.01); *B01D 45/12* (2013.01); *B01D 50/002* (2013.01); *B01D 45/06* (2013.01); *B29C 65/00* (2013.01)

(58) Field of Classification Search
CPC ...... B01D 45/08; B01D 50/002; B01D 45/06; B01D 45/12; B29C 65/00
USPC .............. 55/440–446, 320, 342, 462, 465; 96/189–191; 95/267
See application file for complete search history.

(56) References Cited

U.S. PATENT DOCUMENTS 5,112,375 A  5/1992  Brown
6,712,884 B2  3/2004  Brück et al.
(Continued)

FOREIGN PATENT DOCUMENTS

| CN | 1438911 A | 8/2003 |
|---|---|---|
| CN | 101229462 A | 7/2008 |
| DE | 102005046810 A1 | 4/2007 |
| EP | 1930059 A1 | 10/2007 |
| GB | 1557307 | 12/1979 |

OTHER PUBLICATIONS

International Search Report and Written Opinion dated Nov. 16, 2011 in International Application PCT/EP2011/065386 filed Sep. 6, 2011.
(Continued)

*Primary Examiner* — Dung H Bui
(74) *Attorney, Agent, or Firm* — Kilpatrick Townsend & Stockton LLP

(57) ABSTRACT

A droplet separator (10) includes a flow passage (5) through which a droplet charged gas can be conducted and through which this droplet charged gas can flow along a main flow direction (6), wherein a separation element (8) is arranged essentially in ring shape about the flow passage (5). The separation element (8) has a base element (11) and a top element (12) as well as a plurality of connection elements (1) which are arranged between the base element (11) and the top element (12). The connection element (1) includes a wall element (3, 13, 30) along which droplets of the droplet charged gas can be conducted as a film in the direction of the base element (11), wherein the wall element (3, 13, 30) has a separation surface which has a mean width of more than 1 mm.

15 Claims, 13 Drawing Sheets

(56) References Cited

U.S. PATENT DOCUMENTS

| | | |
|---|---|---|
| 6,770,121 B1 | 8/2004 | Sindel |
| 7,857,879 B2 | 12/2010 | Egger |
| 2006/0096259 A1 | 5/2006 | Meerpohl |
| 2008/0110140 A1* | 5/2008 | Egger .............................. 55/337 |
| 2010/0089242 A1* | 4/2010 | Buthmann et al. .............. 96/190 |
| 2011/0113738 A1* | 5/2011 | Zachos ........................... 55/320 |

OTHER PUBLICATIONS

Search Report mailed Jun. 27, 2014, from Chinese Application No. CN201180047468.0 (4 pages).

* cited by examiner

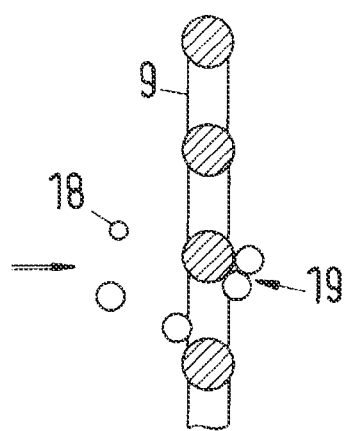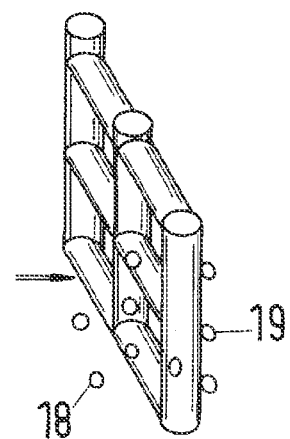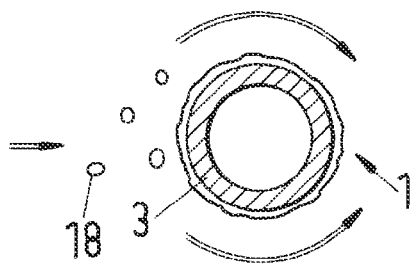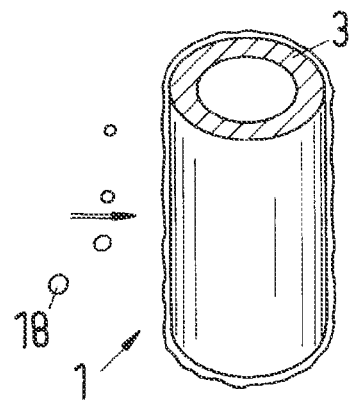

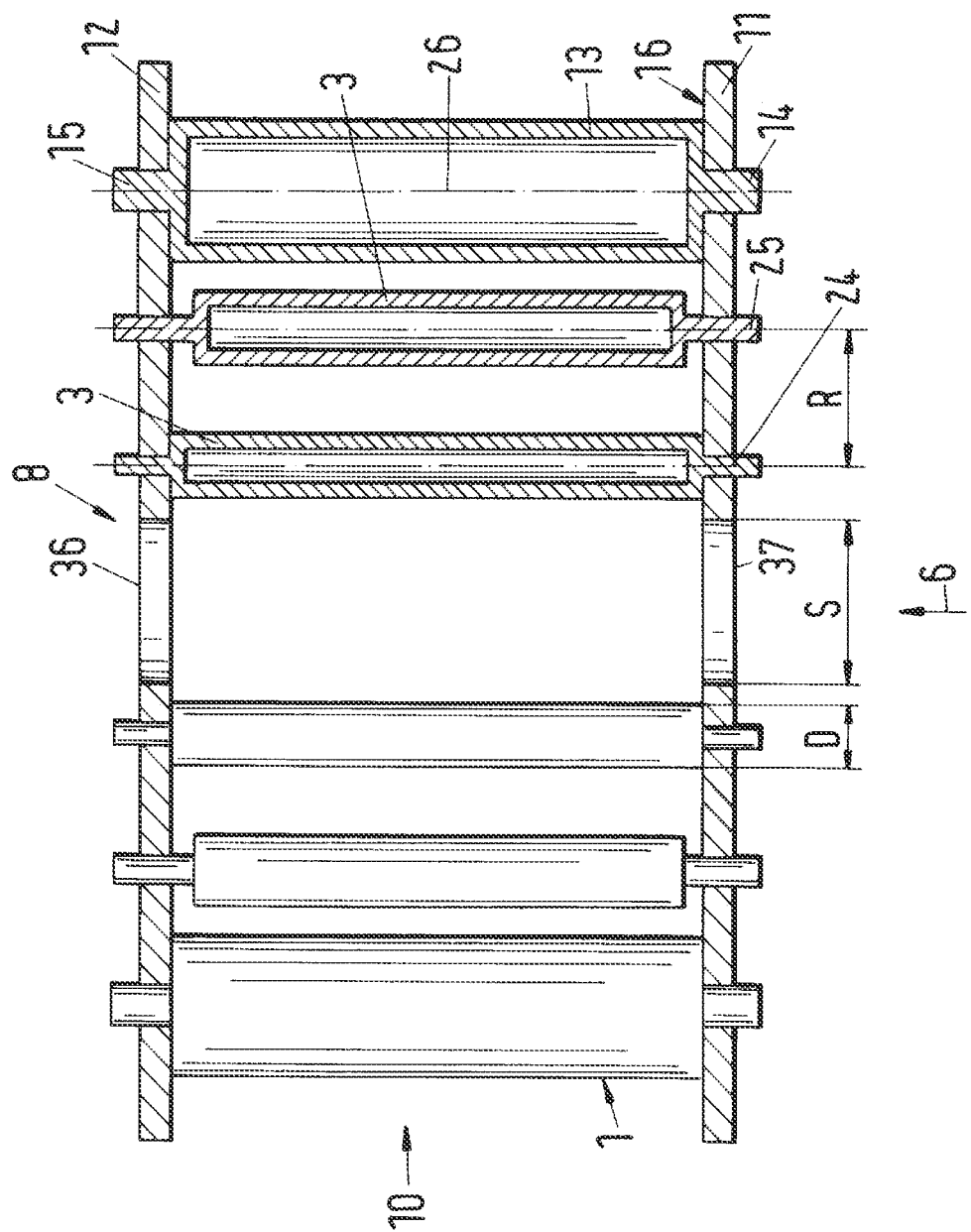

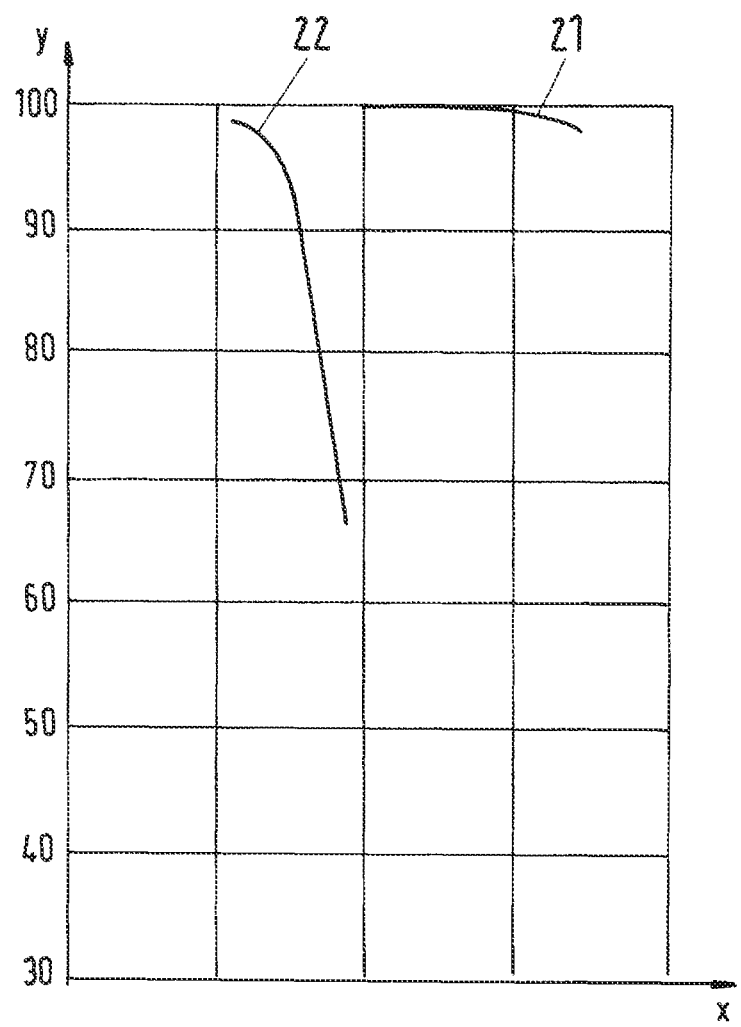

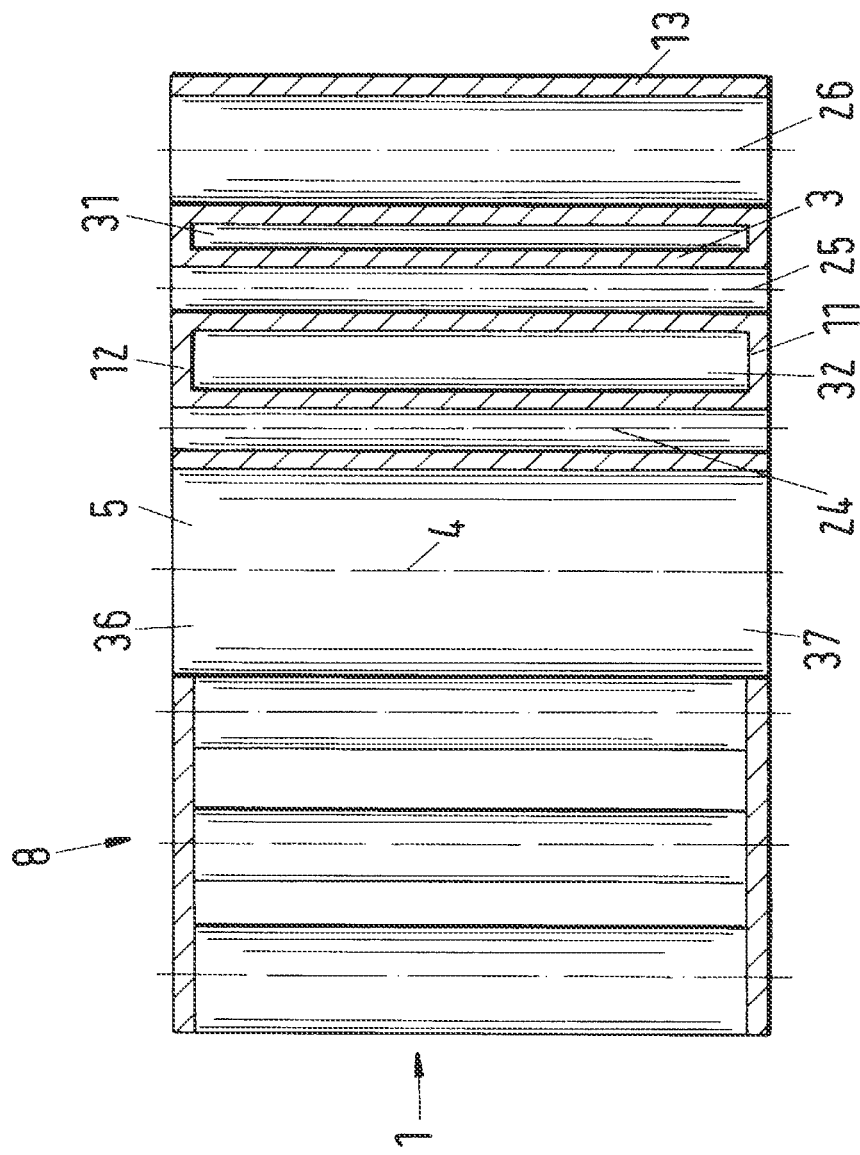

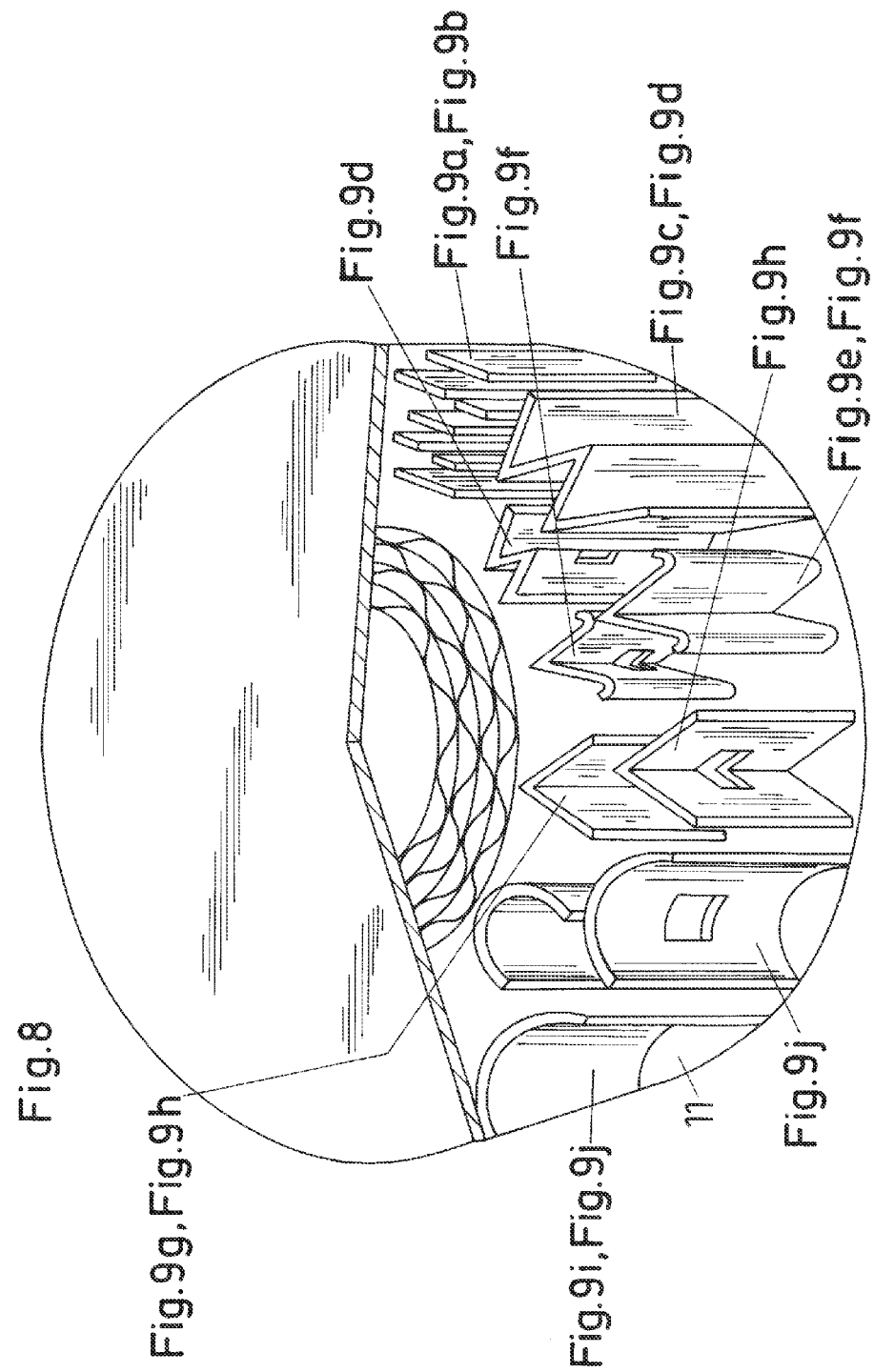

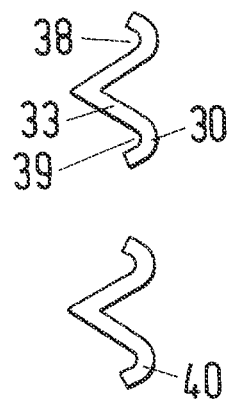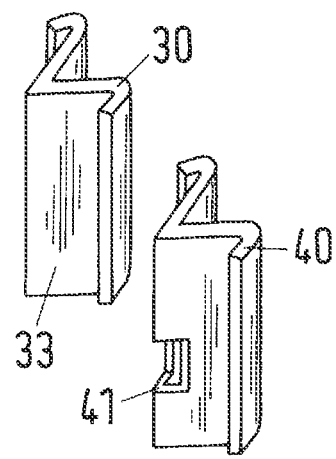
Fig. 9e
Fig. 9f
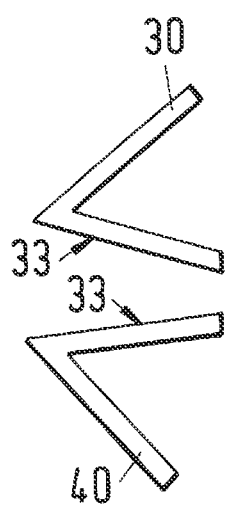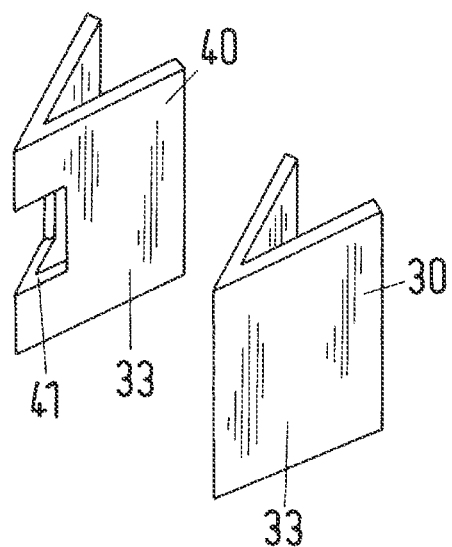
Fig. 9g
Fig. 9h dimensional
DROPLET PRECIPITATOR This application is a U.S. National Phase under 35 USC 371 of PCT Application No. PCT/EP2011/065386 filed Sep. 6, 2011 which claims the priority of EP Application No. 10183928.0 filed on Sep. 30, 2010, the disclosures of which are incorporated by reference herein.

FIELD OF THE INVENTION

The invention relates to a droplet separator for separating drops from a droplet charged gas.

BACKGROUND OF THE INVENTION

A droplet separator in accordance with EP 1 930 059 A1 includes a flow passage through which a droplet charged gas can be conducted and through which this droplet charged gas can flow along a main flow direction. A separation element is arranged in essentially annular shape about the flow passage and has an inner jacket surface, which substantially has the diameter of the flow passage, and openings for the inlet of the droplet-charged gas into the separation element. The separation element extends at least over a part of the length of the flow passage. It has a grid-like structure. A vortex generating apparatus part is arranged with a guide surface in the flow passage and the droplet-charged gas can be brought into a rotary movement by means of the vortex generating apparatus and droplets can be directed by centrifugal force in the direction of the separation element. At least a portion of the droplet-charged gas can be redirected from the main flow direction in the direction of the openings by the guide surface.

Further it is known from the prior art from GB 1 557 307 a three stage column type droplet separator. In the first stage a mixture of a liquid and a gas is introduced and a tangential flow is induced by the deflecting elements, to separate larger droplets from the first stage at the wall of the housing of the droplet separator. In the sump of the column shaped droplet separator, a collection reservoir is foreseen for the liquid separated from the gas. The first, lowermost stage is separated from the second, central stage by a horizontal lateral wall, in which a tube is integrated, which forms a connection for the droplet containing gas into the second stage and also into the third stage. In the second stage, the tube contains an opening, by which the droplet containing gas enters into the chamber of the second stage. In the second stage, the liquid is precipitated on the inner wall of the tube and in the gas flow guided through the opening, which can be transformed into a tangential flow in the chamber of the second stage and is guided by a bypass conduit in the third, uppermost stage. The uppermost stage contains two droplet separators which are arranged one above the other. In the lower one of these droplet separators, the gas enters from the tube.

BRIEF SUMMARY OF THE INVENTION

The droplet separator consists of parallel circular plates. These plates are supported in a parallel, coaxial position. Over an annular pace on the plates holes are drilled. There are inserted into these holes a plurality of rods of various cross sections forming obstacles. The rods can be shaped as angular elements, strips or cylinders. The gas flows along the plates to the outside and passes the angular elements. The liquid is retained at the angular elements and forms a film on their surface. The liquid is discharged through the holes.

If only a single bottom plate or a cover is foreseen as shown in GB 1 557 307 and the gas leaves to the top, a uniform flow is not formed over the entire droplet separator. In order to obtain a uniform flow, a plurality of horizontal intermediate plates have to be foreseen. The liquid is collected at these intermediate plates and is discharged through the holes in the intermediate plates. Thereby it is entrained by the gas stream flowing below the intermediate plate, such that at least a second droplet separator has to be arranged in series thereto. Thus, two droplet separators are arranged one above the other in the third stage in the droplet separator of GB 1 557 307.

It is the object of the invention to provide a droplet separator by means of which an improved separation of droplets, in particular of small droplets, can be obtained.

The droplet separator in accordance with the invention includes a flow passage through which a droplet charged gas can be directed and through which this droplet charged gas can flow along a main flow direction, wherein a separation element is arranged in an essentially ring-shaped manner about the flow passage which can be flowed through by an annular flow directed away from the flow passage wherein the separation element has a base element and a top element as well as one or a plurality of connection elements which are arranged between the base element and the top element such that the base element and the top element are arranged at a spacing from one another which is defined by the connection elements. The connection element includes a wall element along which droplets of the droplet charged gas can be directed as a film in the direction of the base element, wherein the wall element has a mean width of more than 1 mm. To promote the film formation, the mean width can amount to more than 2 mm. A mean width of more than 3 mm can be provided for liquids which require a larger surface for forming a film. The droplet separator can include a separation element which contains a ring element for improving the separation of small droplets. This ring element surrounds the flow passage as a ring-shaped element and has an inner wall surface, which has substantially the diameter of the flow passage. Furthermore inlet openings are foreseen for enabling the droplet charged gas to enter the ring element. This ring element as a grid-like structure, which surrounds the flow passage as a ring shaped element. The grid-like structure is permeable to the droplet charged gas. The smallest droplets are deposited on the grid-like structure and coalesce to form larger drops. These drops are already separated in the grid-like structure or can again be carried along by the gas flow in order to be separated on the separation surface of the connection elements arranged downstream. It is therefore possible with this particularly advantageous embodiment to achieve an almost complete separation of droplets from a gas having a broad drop size distribution. The ring element can include a first layer and a second layer, wherein the first layer is arranged adjacent to the second layer. One of the first or second layers can have a wavy structure; the respective other layer accordingly does not have a similar wavy structure.

Such a connection element can also be formed by a single contiguous profile.

The main flow direction is aligned parallel to the center axis of the flow passage. If the wall elements are arranged parallel to this center axis, the main flow direction is parallel to the wall element and extends in the direction from the base element to the top element. This main flow direction does not as a rule correspond to the flow relationships locally present in the environment of the wall element. The base element and the top element can in particular form a cover so that the base element and the top element are not flowed through by the droplet charged gas.

The width of the wall element is determined in a normal plane on the main flow direction. Since the width of the wall element can be variable along its length, that is along the dimension between the base element and the top element, a mean width is defined in this case. This mean width is defined as the arithmetic mean value of all widths which the wall element adopts over its length.

It is assumed in the following that the droplet charged gas flows substantially radially onto the wall element. This means that the flow direction is displaced by an angle of 85° to 95°, preferably by 90°, with respect to the main flow direction and is radially outwardly directed with respect to the flow passage. This flow shall be termed the radial flow. This means that the radial flow extends substantially in star shape starting from the center axis of the flow passage. The rays of this star-shaped radial flow impact the separation surface of the wall element; the separation surface of the wall element is therefore on the luff side thereof.

The width of the wall element is defined as the line of intersection which is produced with a section of a normal plane on the main flow direction with the wall element on its luff side.

To determine a mean width, at least 2 such normal planes per cm length of the wall element are provided at an equidistant spacing from one another between the base element and the top element. The length of the line of intersection is determined for each of the normal planes and the arithmetical mean value is determined. This arithmetical mean value produces the mean width of the wall element.

An opening for the droplet charged gas is located between two respective adjacent wall elements. Wall elements are adjacent when their longitudinal axes are arranged on a common circle. The longitudinal axis of a wall element passes through the center points of the line of intersection. The sum of all openings with respect to the circle periphery produces a hollow space which can be from 20% to 80%.

The mean width of the wall element is advantageously smaller than the inner diameter (S) of the flow passage.

The base elements and the top elements do not have to directly adjoin the separation surface of the connection element. The connection element includes, in accordance with a preferred embodiment, a tubular wall element along which droplets of the droplet charged gas can be directed in the direction of the base plate. The tubular wall element has a maximum diameter (D) which is smaller than the inner diameter (S) of the flow passage.

The connection element in particular has a longitudinal axis which is substantially directed normally toward the base element and toward the top element. The longitudinal axis can, however, also be inclined by an angle toward the base element and/or top element, wherein the angle amounts to up to 60°, preferably up to 45°, particularly preferably up to 30°, toward the normal plane on the base element.

A plurality of connection elements can be provided, wherein each of the connection elements has a wall element which contains the separation surface.

The wall element can in particular be configured as a tubular wall element. The tubular wall elements are advantageously arranged between the base elements and the top elements such that their longitudinal axes lie on a closed curve which extends about the flow passage. The tubular wall elements form at least one row, wherein the tubular wall elements of a row are arranged about the flow passage on which row two respective adjacent connection elements are arranged substantially equidistantly. Each of these tubular wall elements has a longitudinal axis. If the points of intersection of the longitudinal axes of a row are connected to a plane placed through the gas-side surface of the base element or of the top element, a curve is produced which extends about the flow passage, that is forms a closed curve. A closed curve is thus a path section extending in ring shape without a start point or an end point.

A plurality of connection elements can in particular be arranged between the base element and the top element in a droplet separator in accordance with any one of the preceding embodiments such that their longitudinal axes are arranged on a circle. The longitudinal axes of the connection elements form at least one first circle and one second circle about the flow passage, wherein the first circle is arranged concentrically to the second circle. A particularly advantageous arrangement for separation is thus produced when the connection elements are arranged in a plurality of rows after one another in the flow direction of the annular flow. This in particular allows the improved separation of a wider drop spectrum. The longitudinal axes of the connection elements of the first circle can be arranged at least partly offset to the longitudinal axes of the connection elements of the second circle. The gas flow can hereby be deflected at the tubular wall elements. At least some of the droplets cannot follow this deflection so that the droplets are deposited on the separation surface of the tubular wall elements and are thus separated from the gas flow.

The longitudinal axes of two respective adjacent connection elements can be arranged at a spacing (A) from one another which is larger than the diameter (D) of the tubular wall element.

In accordance with a preferred embodiment, the diameter (D) of the tubular wall element lies in the range from 2 to 20 mm, preferably 5 to 15 mm. If the tubular wall element is not cylindrical, the diameter should be determined as the diameter of a cylindrical tubular wall element of the same jacket surface.

The width and the height of the connection element preferably form a separation surface which has at least one planar section.

The separation surface can in particular contain at least one passage and/or one opening for leading off liquid so that the liquid can exit the droplet separator screened from the gas flow. The passage can in particular be formed as a tube, which is arranged on the outer side of the base element for discharging the liquid therefrom.

In accordance with an alternative embodiment, the separation surface has at least one curved section. The curved section can be formed as a tubular wall element. The tubular wall element can include a first tubular wall element which has a first diameter (D1) as well as a second tubular wall element which has a second diameter (D2). The first diameter (D1) of the first tubular wall element (3) can differ from the second diameter (D2) of the second tubular wall element (13).

The diameter (D) of a first tubular wall element can differ from the diameter of a second tubular wall element. The degree of deflection of the gas flow can hereby be changed, which is of particular advantage when droplet charged gases having a wide droplet size distribution are used.

The tubular wall element can contain a gas permeable structure in accordance with a further embodiment. The gas permeable structure can, for example, include a perforation, a felt-like structure, a porous body, a woven fabric or a knitted material. The gas permeable structure is, however, always formed so that an unimpeded outflow of the separated liquid is possible. The gas permeable structure in particular serves for the formation and maintenance of a liquid film.

The separation surface of the tubular wall element is advantageously constituted such that a wetting of the separation surface with liquid is promoted.

The connection element can contain a foot element and/or a head element by means of which the connection element can be fastened to the base element and/or to the top element.

In accordance with a particularly advantageous embodiment, the separation surface is impermeable to fluids. A liquid film is in particular formed on the separation surface and flows along the separation surface in the direction of the base element.

A collection element for the liquid separated on the separation surface can be provided on the base element.

The connection elements advantageously have a separation surface which is impermeable to fluids. This means that the separation surface should in particular be impermeable to the separated liquid so that a closed liquid film forms on the separation surface. In accordance with a particularly preferred embodiment, the separation surface does not have any openings or perforations.

The droplet separator can also contain a plurality of separation elements arranged one above the other.

In accordance with a further embodiment, the separation element can be configured as a one-piece component. This allows the manufacture of the separation element in a molding process, in particular in an injection molding process.

A droplet separator in accordance with any one of the preceding embodiments can in particular be used for the separation of condensate from natural gas. This condensate can contain condensed fractions from the natural gas, that is in particular longer chain hydrocarbons.

The invention will be explained in the following with reference to the drawings. There are shown:

BRIEF DESCRIPTION OF THE DRAWINGS

FIG. 2a is a plan view of an element of a grid-like structure in accordance with the prior art;

FIG. 2b is a side view of an element of a grid-like structure in accordance with the prior art.

FIG. 2c is a plan view of a connection element in accordance with FIG. 1;

FIG. 2d is a side view of a connection element in accordance with FIG. 1;

FIG. 3 is the structure of a droplet separator with wall elements in accordance with FIG. 2c and FIG. 2d;

FIG. 6a is a comparison of the quality of the separation of a droplet separator in an already known embodiment with droplet separators in accordance with the invention in accordance with FIG. 1;

FIG. 7a is the structure of a droplet separator in accordance with a third embodiment;

FIG. 7b is a plan view of the droplet separator in accordance with FIG. 7a;

FIG. 8 is a droplet separator containing different variants of connection elements;

FIG. 9e a plan view of a third variant of connection elements for the droplet separator in accordance with FIG. 8;

FIG. 9f is a side view of the third variant of connection elements for the droplet separator in accordance with FIG. 8;

FIG. 9g is a plan view of a fourth variant of connection elements for the droplet separator in accordance with FIG. 8;

FIG. 9h is a side view of the fourth variant of connection elements for the droplet separator in accordance with FIG. 8;

FIG. 1 shows a droplet separator 10 including a flow passage 5 through which a droplet charged gas is conducted along a main flow direction 6. The main flow direction in the flow passage 5 can be parallel to the longitudinal axis 4 of the flow passage 5. The longitudinal axis 4 of the flow passage 5 extends in the direction of the z axis of the coordinate system in the bottom left hand corner of FIG. 1.

DETAILED DESCRIPTION OF THE INVENTION

Figure 1:
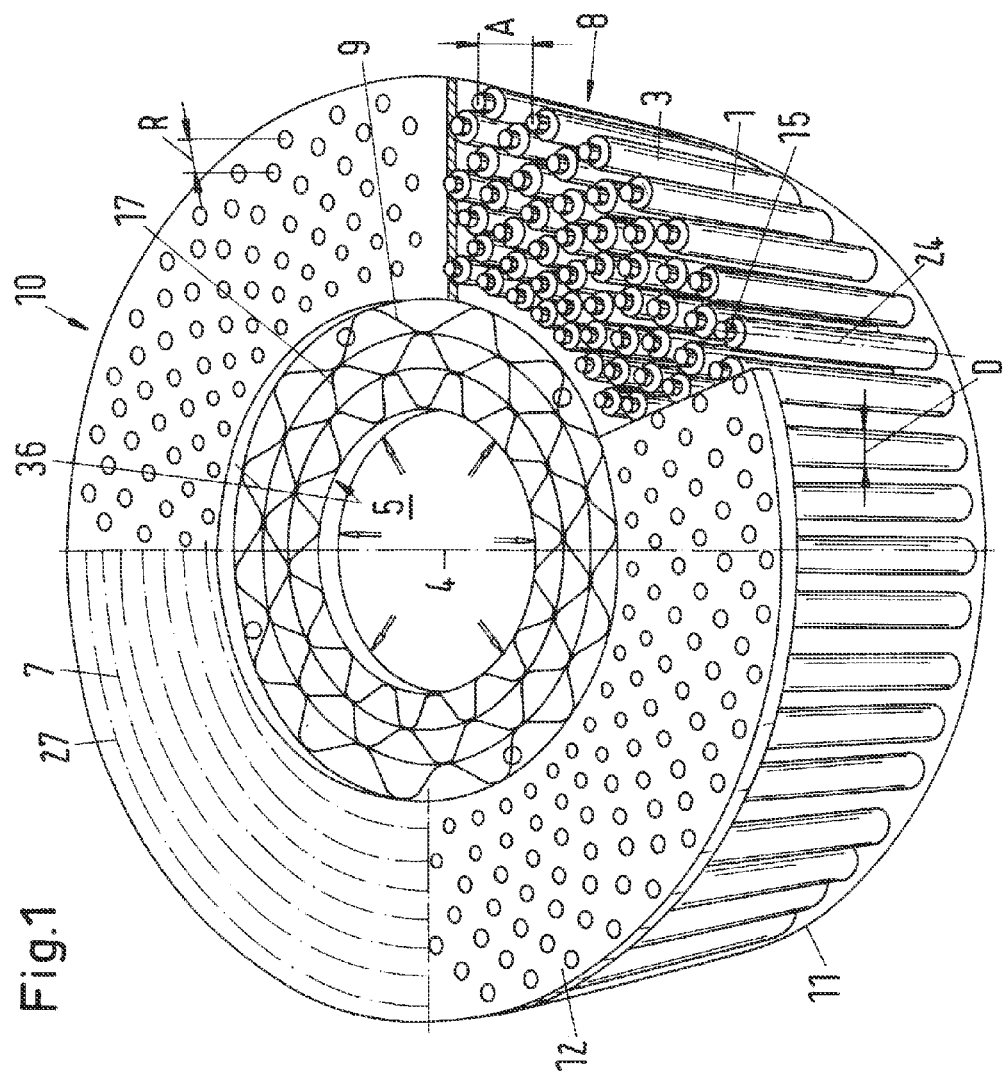
FIG. 1 is a droplet separator in accordance with the invention in accordance with a first embodiment.

The separation element 8 is arranged in essentially annular shape about the flow passage 5. The separation element 8 has a base element, here configured as a base plate 11, and a top element, here configured as a top plate 12, as well as a plurality of connection elements 1 which are arranged between the base plate 11 and the top plate 12. The base plate 11 and the top plate 12 are arranged at a spacing from one another which is defined by the connection elements 1.

The base plate 11 and/or the top plate 12 have an opening which corresponds to the diameter of the flow passage 5. Only the opening 36 in the top plate 12 is visible in FIG. 1. If no opening is provided at one of the base plates or top plates, the droplet charged gas supplied axially through the flow passage 5 is radially deflected in the direction of the separation element 8. The radial flow through the separation element thus takes place radially from the flow passage 5 in the direction of the outer jacket surface which is spanned between the outer edges of the base plate 11 and the top plate 12.

A vortex generating apparatus part, as described in EP 1 930 059 A1, can be provided by means of which the droplet charged gas is directed in the direction of a separation element 8. This is shown at an embodiment in FIG. 10. A change in direction is imposed on the flow of the droplet charged gas by means of the vortex generating apparatus part so that a radial component of the speed is already imposed on the flow. The droplet charged gas is diverted in the direction of the separation element 8 by this radial component and then exits the separation element 8 in a substantially radial direction. The vortex generating apparatus part can advantageously be used for preseparation, that is some of the droplets are already separated before they enter into the flow passage 5.

FIG. 1 furthermore shows a ring element 17 which is arranged between the flow passage 5 and the connection elements 1. The ring element 17 is here configured in accordance with EP 1 930 059 A1 and will be described in even more detail in the following.

The connection element 1 has a longitudinal axis 24 which is aligned substantially normally to the base plate 11 and to the top plate 12. The connection element 1 is held in the base plate 11 by means of a non-visible foot element and is held in the top plate 12 by means of a head element 15. A snap-in connection or a screw connection can be provided as the holding connection, for example.

The outer diameter of a separation element 8 is usually below 400 mm. The diameter (D) of the tubular wall element preferably amounts to 2 to 20 mm, in particular to 5 to 15 mm. The diameters of tubular wall elemens which are attached to the same base plate can vary. The connection elemens 2 are preferably arranged such that their longitudinal axes 24 lie on a circle whose center lies on the longitudinal axis 4. The longitudinal axes 24 of connection elements arranged adjacently in a circle have a spacing A from one another. The sum of the spacings (A) along such a circle is larger than the sum of the diameters of the connection elements so that a gap between the tubular wall elements 3 remains through which the droplet charged gas can flow.

The radial spacings of adjacent rows are likewise selected so that the radial spacing (R) between two adjacent circles is larger than the sum of the radii of two connection elemens lying on these adjacent circles. The radial spacings (R) of adjacent rows of connection elements 1 can also be different, which is shown in FIG. 3. If the diameter of the connection element is variable, the mean diameter is to be used.

Furthermore, as is shown in FIG. 1, the separation element 8 contains also contain a ring element 17. This ring element 17 can in particular adopt any of the shapes which were described in EP 1 930 059 A1. The ring element 17 is arranged essentially in ring shape about the flow passage 5 and has an inner jacket surface, which substantially has the diameter of the flow passage 5, and passage openings for the inlet of the droplet charged gas into the ring element which are not shown in the drawing.

The ring element 17 extends at least over a part of the length of the flow passage 5. It includes a grid-like structure 9. The passage openings can be the intermediate spaces between the grid elements of the grid-like structure.

This grid-like structure 9 can be formed by a wire net, for example. Alternatively to this, a knitted fabric or a woven fabric can be used. The grid-like structure can also be configured in felt form, that is can be configured from structural elements, for example wires or threads, arranged randomly with respect to one another. The grid-like structure is arranged in one layer or in a plurality of layers. Each of these layers forms a ring-shaped element which surrounds the flow passage.

Such a ring-shaped element preferably has at least the same height as the separation surface of a tubular wall element.

Alternatively, or in addition to the grid-like structure 9, bulk packings can be used, for example Dixon rings or torques.

The layer which is formed by the ring-shaped element can have a corrugation. Adjacent layers can be arranged at a spacing from one another due to the corrugation. Adjacent layers can in particular be corrugated and non-corrugated. A corrugation should be understood as a structure which can have a wavy surface, a zig-zag surface or a surface provided with bulges or indentations. The corrugations can be arranged such that the vertices of the wave peaks are aligned parallel to the longitudinal axis 4. It is also possible that the vertices of the wave peaks include an angle with the longitudinal axis which can be up to 70°, preferably up to 60°, particularly preferably up to 45°.

The flow passage 5 can have an opening 36 both in the base element and in the top element. One of these openings can also be closed in the operating state so that the flow is deflected, and indeed from the axial direction, that is in the direction of the longitudinal axis 4 in the direction of the tubular wall elements 3, that is in the radial direction.

Figure 10:
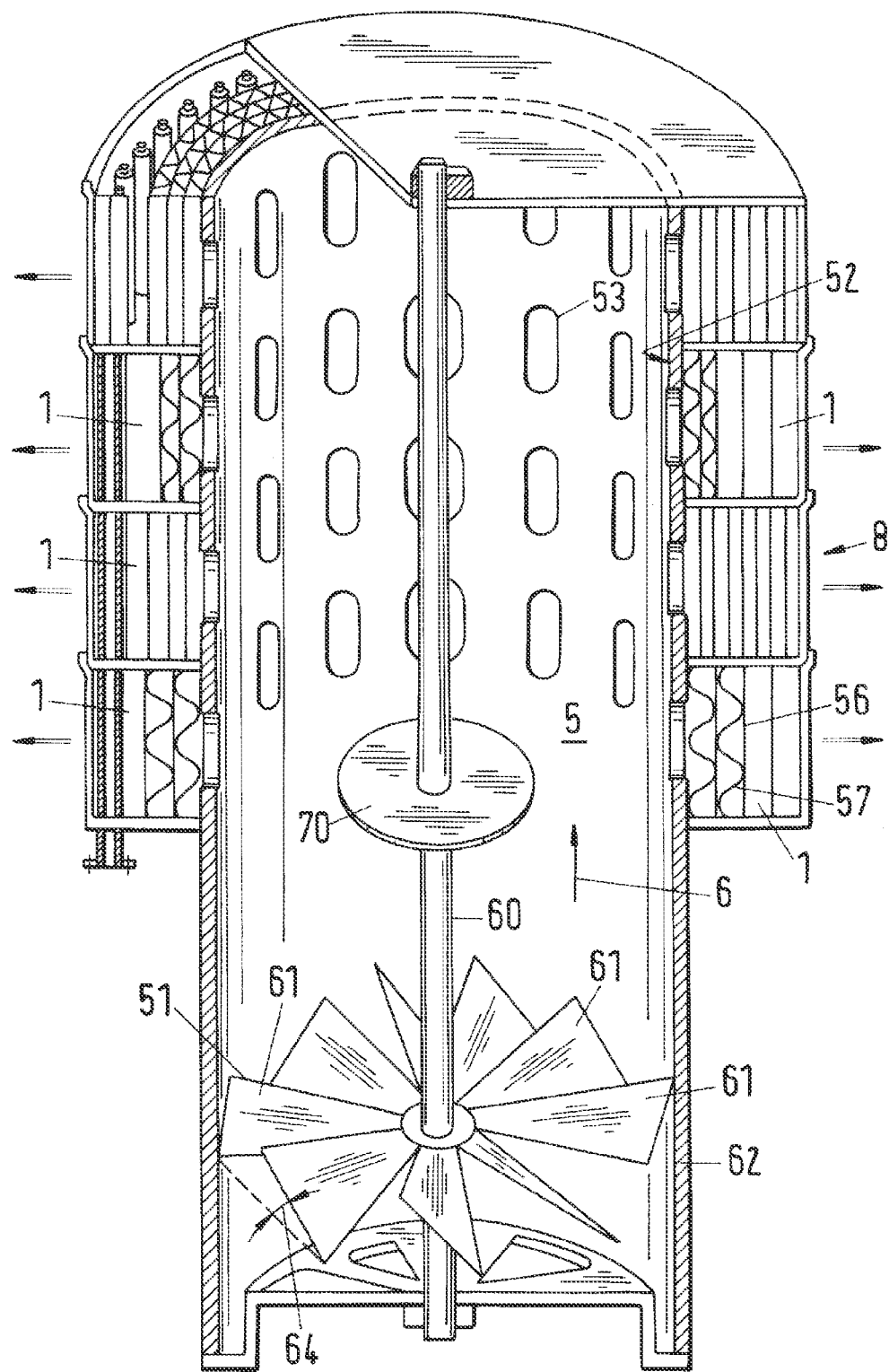
FIG. 10 is an arrangement for separating a droplet charged gas, said arrangement containing a plurality of droplet separators in accordance with the invention.

A plurality of separation elements 8 can be arranged above one another; for example, a plurality of separation elements can form a stack, such as was likewise described in EP 1 930 059 A1 and is shown in FIG. 10. If the droplet separator is composed of a plurality of separation elements 8 arranged above one another, with the exception of the separation element disposed furthest downstream, both the opening 37 (see FIG. 3, FIG. 7a) in the base element 11 and the opening 36 in the top element 12 are present.

FIG. 2a and FIG. 2b show the separation along an element of a grid-like structure 9, as is also known from the prior art. FIG. 2a is a plan view of a section of a grid-like structure; FIG. 2b a side view of a section of this grid-like structure 9. The ring element 17 of FIG. 1 is composed of such a grid-like structure 9 which is configured, for example, as a wire net. It allows the deposition of droplets 18. Small droplets can coalesce, that is at least two small droplets form a larger drop 19 which is separated. Such drops 19 move in the direction of the base plate, as is visible in FIG. 2b, under the effect of gravity.

The separation works without problem as long as the gas speed remains under a critical speed value. The drop 19 is taken up by the gas flow again above this critical speed and is again taken along with the gas flow. This means that the efficiency of the separation reduces greatly, as is demonstrated with reference to FIG. 6.

The embodiment of the droplet separator 10 in accordance with the invention therefore includes connection elements 1 which will be described in the following. In FIG. 2c, a plan view of an open connection element 1 is shown such as can be found outside the ring element 17 in FIG. 1. The connection element is configured as a tubular wall element 3 here. The droplets of the droplet charged gas which flow onto the connection element 1 impact the surface of the tubular wall element 3. The droplets 18 are distributed over its surface, in particular when the surface is manufactured from a material which has a good wettability for the liquid. Droplets of the droplet-charged gas can be conducted along the tubular wall element 3 as a liquid film in the direction of the base plate of the separation element (see FIG. 1).

The tubular wall element 3 has a separation surface which corresponds to the total outer jacket surface. In accordance with this embodiment, the separation surface thus extends over the total periphery of the tubular wall element 3. The cylindrical shape of the tubular wall element 3 promotes the separation of the droplets over the total jacket surface. The flow is conducted around the tubular wall element 3, as the drawn arrows provided with double lines should indicate.

Since the tubular wall element does not have any edges in this embodiment, a breakaway of the flow and a formation of a vortex associated therewith is less pronounced even though the flow is directed about the tubular wall element. This means that the droplets are deflected with the gas flow to flow around the tubular wall element. It is, however, to be expected due to the specific weight of the droplets that the droplets do not participate in the deflection, or at most partially. It follows from this that the droplets are hurled toward the wall of the tubular wall element and form a liquid film there. This liquid film extends at least over a part of the jacket surface of the tubular wall element. This liquid film thus covers the separation surface of the tubular wall element at least partially.

FIG. 3 shows a section through a separation element 8 which includes a plurality of connection elements 1 which are arranged between a base element which is configured as a base plate 11 and a top element which is configured as a top plate 12. The connection elements include tubular wall elements 3 which correspond to the type shown in FIG. 2c or FIG. 2d. The base plate 11 contains an opening 37 through which the droplet charged gas enters into the droplet separator 10. The cover plate 12 can also have an opening 36, in particular if a plurality of separation elements 8 are arranged over one another, as shown in FIG. 10.

A connection element is composed of the tubular wall element 3 as well as of a foot element 14 and of a head element 15. The foot element 14 is connected to the base plate 11 and the head element 15 is connected to the top plate 12. The connection can, as is shown in this embodiment, be configured as a plug-in connection. Each of the connection elements has a longitudinal axis 24, 25, 26.

The method for manufacturing the separation element in accordance with FIG. 3 thus includes the steps of manufacturing the connection elements as well as the fastening of the connection elements to the base plate, wherein in particular the connection elements are plugged into corresponding openings of the base plate. The top plate is subsequently connected to the head elements of the connection elements. The top plate contains openings to accept the head elements. The head elements are introduced into the openings of the top plate. Optionally, the head elements can be connected to the corresponding base plate or top plate by an adhesive connection or by a weld connection.

The connection elements can have different diameters (D). Furthermore, the radial spacing (R) of the longitudinal axes 24, 25 can differ from the radial spacing of the longitudinal axes 25, 26 from respective adjacent rows of connection elements.

Figure 4:
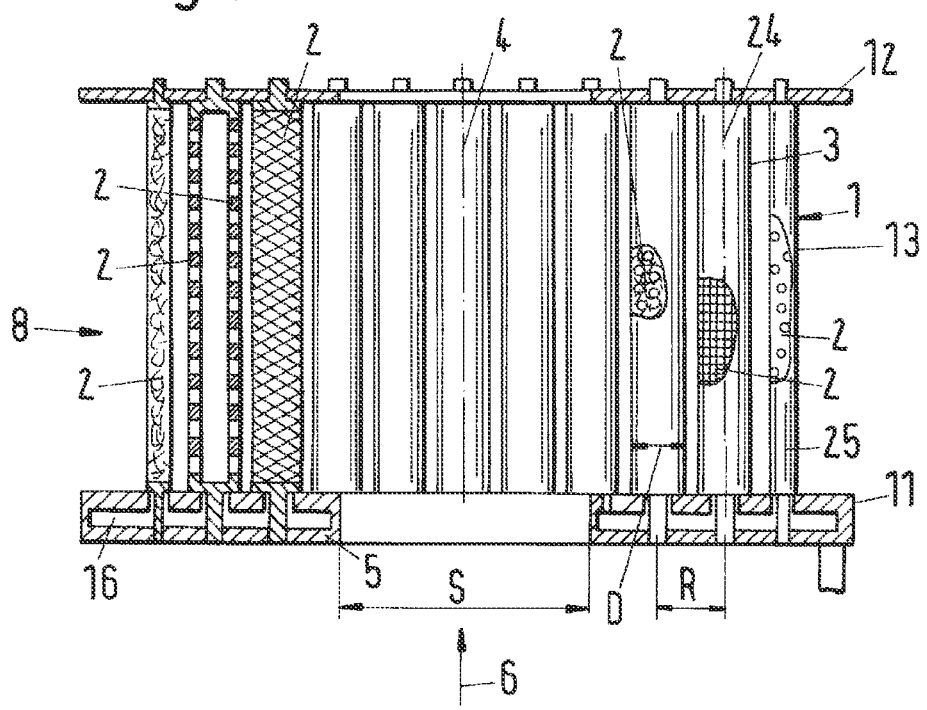
FIG. 4 is the structure of a droplet separator in accordance with a second embodiment.

The connection element 1 can, in accordance with a further embodiment, include a plurality of gas permeable structures 2, of which some variants are shown in FIG. 4. These gas permeable structures can be formed, for example, by a wire net. Alternatively to this, a knitted fabric or a woven fabric can be used. The gas permeable structure 2 can also be composed of elements arranged randomly with respect to one another, such as are present, for example, in a felt-type structure. The gas permeable structure can furthermore include a porous sleeve. Different gas permeable structures can be combined with one another.

The gas permeable structures 2 can also include a plurality of layers with different permeability, that is a differently large portion of openings. A spacing can furthermore be provided between individual layers of gas permeable structures so that a coalescence of droplets can take place. The droplets move as a trickle in the direction of a collection element 16 which can be arranged on the base plate or which can be attached beneath the base plate as a kind of collection trough.

Figure 5A:
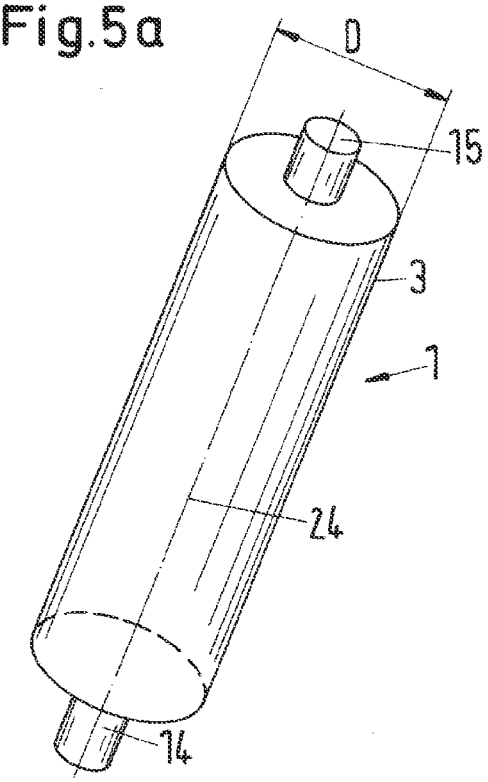
FIG. 5a is a detail of a connection element in accordance with one of the embodiments shown in FIG. 1, 3 or 4.

FIG. 5a shows a detail of a connection element in accordance with the first embodiment in accordance with FIG. 1. The connection element 1 includes, in accordance with the embodiment of FIG. 5, a tubular wall element 3 which is configured such that droplets of the droplet charged gas can be conducted along the tubular wall element 3 in the direction of the base plate 11 shown in FIG. 1. The tubular wall element 3 contains the separation surface. The connection element 1 furthermore has a foot element 14 and a head element 15 which is arranged at the first end and at the second end of the tubular wall element 3.

The tubular wall element 3 preferably has a maximum diameter (D) which is smaller than the inner diameter (S) of the flow passage 5, see FIG. 3 or FIG. 4 in this respect.

Figure 5B:
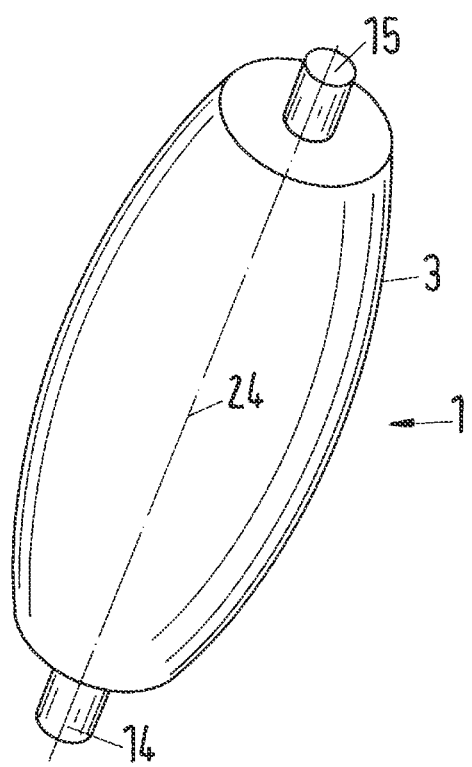
FIG. 5b is a variant of a connection element.

FIG. 5b shows a variant of a connection element 3. The connection element 3 is rotationally symmetrical about its longitudinal axis 24; however, its diameter is not constant. The connection element has, as in the previous embodiment, a foot element 14 and a head element 15 which serve for the connection to a base plate or to a top plate. The diameter increases continuously from the foot element 14 up to and into a center region of the longitudinal dimension in order subsequently again to reduce continuously. This variant is an embodiment of a wall element with a variable diameter. Any desired variants of the diameter are naturally possible in dependence on how the gas flow should be distributed over the separation surfaces.

FIG. 6 shows a comparison of the quality of the separation of a droplet separator in accordance with the prior art having a droplet separator in accordance with the invention in accordance with FIG. 1, wherein the lambda value, a measure for the capacity of the separator, is entered on the x axis. The y axis shows the efficiency of the separation in %.

The curve with the reference symbol 21 shows the degree of separation of a droplet charged gas, here diethylene glycol. A droplet separator in accordance with FIG. 1 was used. This droplet separator is composed of a coalescence part which is configured in accordance with EP 1 930 059 A1 and of a dewatering part which contains connection elements 1 in accordance with FIG. 1, 3 or 5. The measurements were carried out at a separation element 8 which has a diameter of the flow passage 5 of 85 mm. The flow passage 5 is surrounded by a ring element 17 which forms the coalescence part. A plurality of rows of connection elements 1 adjoin the ring element, as is also shown in FIG. 1. The outer diameter of the ring element amounts to 142 mm for the trial. The grid-like structure 9 of the coalescence part is composed of steel and is made up of a metal fabric which has a plurality of layers having a corrugated profile wound up in cylindrical shape as well as a plurality of layers having a cylindrical profile.

The structures of the dewatering parts can selectively be composed of plastic or metal in dependence on the temperature and on the chemical composition of the gas flow and possible interactions with the polymer. The inner diameter of the dewatering part amounted to 142 mm for the tests and the outer diameter to 260 mm. Six rows of connection elements were used, with the diameter of the circle (K) which the longitudinal axes of the connection elements span, the diameters (D) of the connection elements in each circle and the number of the connection elements in each circle being reproduced in the following compilation:

| K | 153 | 168 | 181.4 | 202 | 225 | 243 |
|---|---|---|---|---|---|---|
| D | 6.5 | 6.5 | 6.5 | 9 | 9 | 9 |
| Number | 48 | 48 | 48 | 48 | 48 | 48 |
| Hollow space | 0.65 | 0.59 | 0.55 | 0.68 | 0.61 | 0.57 |

The respective so-called lambda value relating to the jacket surface of the droplet separator is entered on the x axis of FIG. 6. The lambda value is also called the Souders-Brown factor. The maximum gas speed in liquid-gas separation tanks is determined using the Souders-Brown factor.

$$V = \text{lambda}(\rho_L - \rho_V)/\rho_V)^{1/2}$$

V=maximum permitted gas speed in m/s
$\rho_L$=density of the liquid
$\rho_V$=density of the gas
Lambda=0.107 m/s when the container contains a knitted fabric separator (mesh pad) which is operated in counter-flow.

The curve with the reference numeral 22 shows the separation degree of environmental air charged with droplets of diethylene glycol on the use of a droplet separator in accordance with the prior art as described, for example, in EP 1 930 059 A1. A comparison of the capacity of a separation element in accordance with EP 1 930 059 A1 and of a separation element in accordance with FIG. 1 results in a capacity up to 40% higher.

It also resulted in the trials that the quality of the separation greatly depends on the material system. The wettability of the surfaces of the connection elements in particular plays a role. With a good wettability, the deposition and coalescence of the liquid takes place better, that is it is possible to operate the droplet separator at higher capacity, that is with increased gas speed.

A variant is shown in FIG. 7a in accordance with which the separation element 8 is structured in one piece. The base element 11, the top element 12 and the connection elements 1, which contain tubular wall elements 3, 13 as in FIG. 3, are composed of a single piece. The droplet charged gas flows, as in the preceding embodiments, through a flow passage 5 into the inner space of the separation element.

Figure 7B:
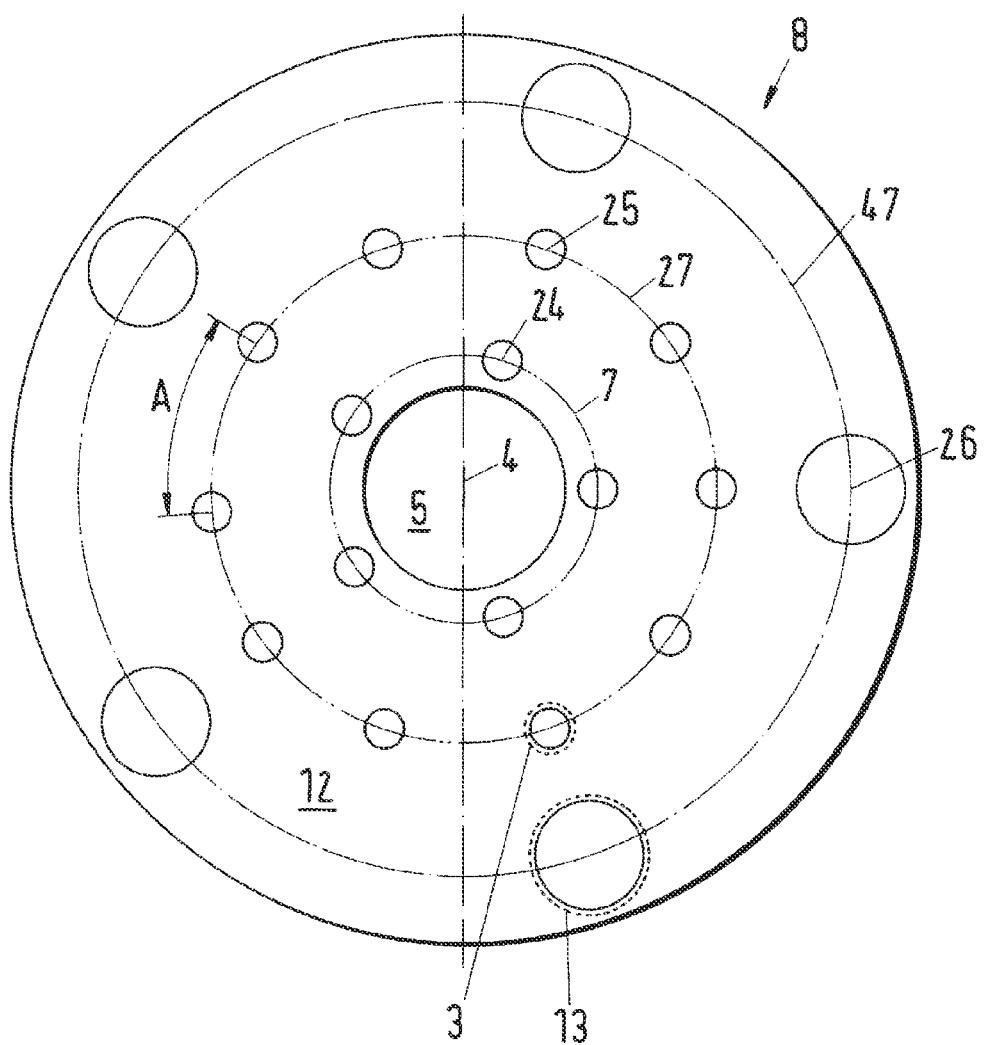

The connection elements 1 in FIG. 7b are arranged between the base plate 11 and the top plate 12 such that their longitudinal axes 24 lie on a closed curve 7 which extends about the flow passage 5. In the present embodiment, this curve 7 is a circle. In accordance with FIG. 1 or also with FIG. 7b, a plurality of concentric circles 7, 27, 47 are provided whose common centers lie on the longitudinal axis 4 of the flow passage 5.

The centers of longitudinal axes 24, 25, 26 of connection elements 1 lie on each of these circles. The connection elements have a cylindrical shape. In FIG. 1, adjacent connection elements do not contact one another in a row so that a gap remains free between two adjacent connection elements. This means that the longitudinal axes of two respective adjacent connection elements 1 in the same row are arranged at a spacing (A) from one another which is larger than the sum of the radii of the two adjacent tubular wall elements 3.

The method for manufacturing the separation element in accordance with FIG. 7a or FIG. 7b is preferably a molding method, for example an injection molding method. It can also be of advantage from a technical injection molding aspect to produce the base element 11 or top element 12 separately since depending on the number and arrangement of the connection elements the intermediate spaces 31, 32 through which the droplet charged gas is conducted in the operating state can be difficult to manufacture.

FIG. 8 shows a droplet separator which contains different types of connection elements. Each of these connection elements will be described more exactly in the following with reference to FIGS. 9a to 9j named in FIG. 8. The variants can be combined with one another as desired.

Figure 9A:
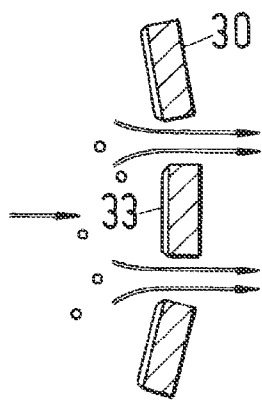
FIG. 9a is a plan view of a first variant of connection elements for the droplet separator in accordance with FIG. 8.
Figure 9B:
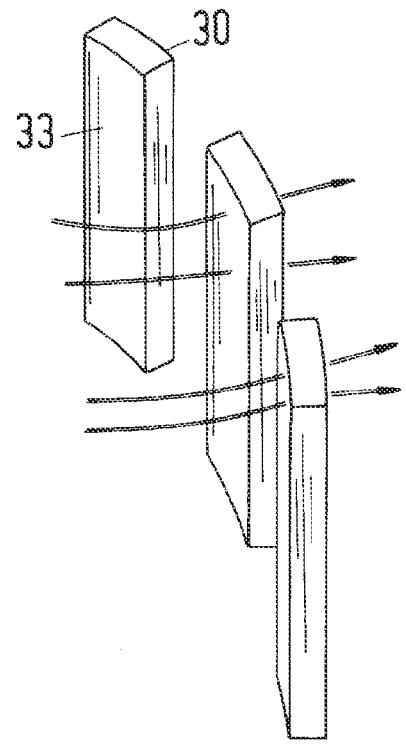
FIG. 9b is a side view of the first variant of connection elements for the droplet separator in accordance with FIG. 8.

FIG. 9a is a plan view of a first variant of connection elemens for the droplet separator in accordance with FIG. 8. The connection elements 30 are formed as well elements which have a substantially rectangular cross-sectional surface. The height of the wall elements corresponds to at least the spacing between the base plate and the cover plate. The wall elements have a width which is substantially constant in accordance with FIG. 9a. The thickness of the wall elements is also substantially constant. The width could naturally also vary relative to the height of the wall elements.

In accordance with a variant which is particularly easy to manufacture, the wall elements are a part of a metal sheet from which intermediate spaces have been punched. The intermediate spaces form passage openings for the droplet charged gas. The droplet charged gas impacts the inner side of the connection element 30 along its width. Droplets are deposited on the separation surface 33 which extends along the width over the height of the hall elements and form a liquid film on this separation surface. The liquid film flows along the separation surface in the direction of the base plate 11 (see FIG. 8).

The connection elements 30 can, as in FIG. 7b, likewise be arranged on concentric circles. The width of individual connection elements can be different; the spacings between two respective adjacent connection elements can also differ.

Figure 9C:
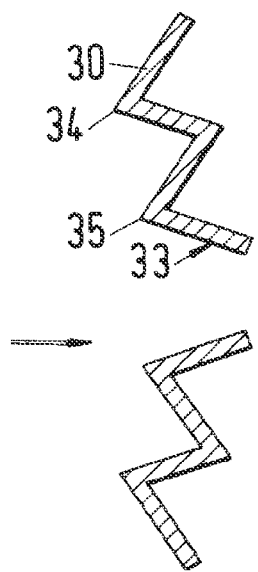
FIG. 9c is a plan view of a second variant of connection elements for the droplet separator in accordance with FIG. 8.
Figure 9D:
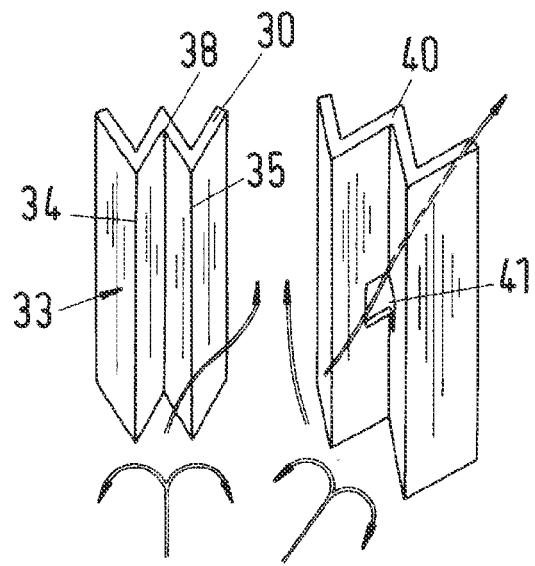
FIG. 9d is a side view of the second variant of connection elements for the droplet separator in accordance with FIG. 8.

FIG. 9c and FIG. 9d show a second variant of the connection elements. Each of the connection elements shows a zig-zag profile in the form of a W. The luff side is formed from the lower part of the W. This means that two flow edges 34, 35 are formed. An open passage 38 is formed between the two flow edges 34, 35. The liquid separated over the separation surface 33 can collect in this open passage and be conducted in the direction of the base element.

FIG. 9d also shows an alternative embodiment of the connection element 30, the connection element 40. It differs from the connection element 30 such that it has a window-like opening 41. Both gas can pass through this opening 41 and liquid can be conducted through it to the lee side of the connection element 40.

FIG. 9e and FIG. 9f show a third possible embodiment of the connection elements. The connection elements 30, 40 of FIG. 9e or 9f differ from the connection elements of FIG. 9d and FIG. 9e only in that the outer limbs of the W are shortened and the upper side of the shortened W forms the luff side of the connection elements. The separation surface 33 is thus bounded by a pair of open passages 38, 39. The liquid can be collected in these open passages and can flow off largely without hindrance by the gas flow.

In FIG. 9f, the connection element 40 in turn contains a window-like opening 41, in particular to conduct liquid from the luff side to the lee side of the connection element.

FIG. 9g and FIG. 9h differ from the connection elements in accordance with FIGS. 9e and 9f only such that the cross-section is V-shaped. The separation surface 33 in this case does not contain any open passage.

Figure 9I:
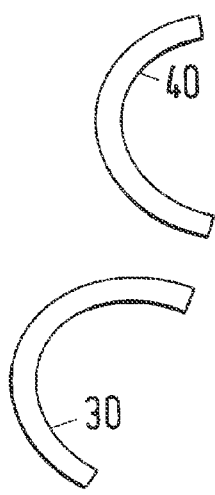
FIG. 9i is a plan view of a fifth variant of connection elements for the droplet separator in accordance with FIG. 8.
Figure 9J:
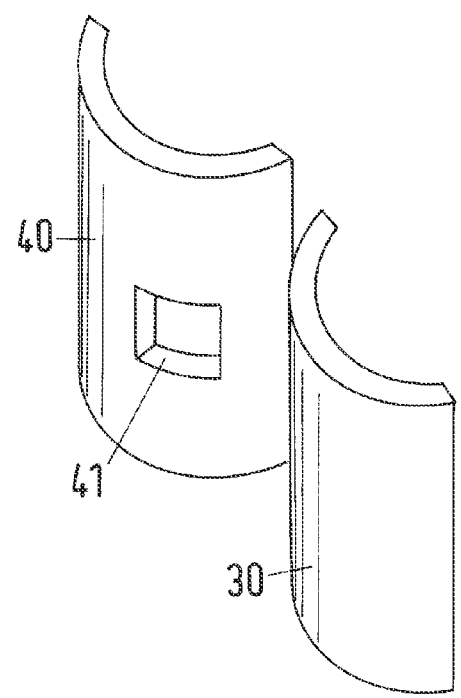
FIG. 9j is a side view of the fifth variant of connection elements for the droplet separator in accordance with FIG. 8.

FIG. 9i and FIG. 9j show a variant in accordance with which the cross-section of the connection elemens 30, 40 is configured in U shape. In FIG. 9j, it is additionally shown that the connection element 40 has a window-like opening 41.

The connection element in accordance with any of the preceding embodiments can be composed of metal, of a ceramic material or also of plastic or can include a composite of these materials.

FIG. 10 shows an arrangement for separating droplets from a droplet charged gas which includes a flow passage 5 through which the droplet charged gas is conducted along a main flow direction 6. A vortex-generating apparatus part 51 is provided in the flow passage 5 and the droplet charged gas is conducted by means of it in the direction of one of the separation elements 8. A change of direction is imposed onto the flow by means of the vortex generating apparatus part 51, whereby the speed of the gas particles and liquid particles is given a radial component. The gas flow is diverted by this radial component in the direction of the inner jacket surface 52 which surrounds the flow passage 5. The gas flow then enters via openings 53 provided in the inner jacket surface in the substantially radial direction into the respective separation element 8. Some of the liquid droplets can already be incident on the inner jacket surface and be separated there by the additional radial component of the force acting on the droplets.

Each of the separation elements 8 is arranged essentially in annular shape about the flow passage 5 and extends over at least a part of the length of the flow passage 5. In FIG. 10, for example, four separation elements 8 are arranged one above another. A separation element 8 includes a plurality of grid-like structures 9 as well as, outside thereof, one connection element or a plurality of connection elements 1 in accordance with one of the preceding embodiments.

A series of embodiments have proven themselves for the arrangement of grid-like structures 9 in the separation element 8. The separation element in accordance with FIG. 10 contains cylindrical structures 56 and wavy structures 57 alternately. The cylindrical structures 56 are arranged parallel to the main flow direction 6. A respective wavy structure 57 is arranged between two adjacent cylindrical structures 56.

The wavy structures 57 are advantageously arranged such that an incline can form so that the liquid coalescing at the grid-like structures can flow off.

The number of separation elements to be stacked over one another is determined by the charge and by the size distribution of the droplets in the gas at the inlet into the arrangement. With a very wide distribution with drop sizes differing greatly from one another as well as with a high liquid charge, a larger construction height will be necessary for each individual separation element 8 or a stack of a plurality of separation elements arranged over one another will be necessary. In this case, the large drops are substantially carried out by the separation element 8 which is arranged in very close proximity to the vortex generating apparatus part 51, whereas the small, light droplets cover a longer path together with the gas flow so that they are only carried out in further removed separation elements 8.

Separation elements 8 having grid like structures 9 of a different type as well as having different arrangements of connection elements can be combined as desired. The grid-like structures differ, for example, in the size of the passage openings so that, analogously to a screen structure or a filter structure, structures of different permeability can be combined in a droplet separator. For this purpose, woven fabrics of different fineness can be used, for example. The connection elements can be combined in any desired combination with the grid-like structures while adapting the hollow space to the corresponding separation task. Alternatively to this, separation elements without grid-like structures can also alternate with separator elements which contain grid-like structures.

The vortex generating apparatus part 51 is arranged in the interior of the flow passage 5 and contains a plurality of guide surfaces 61, whereby at least some of the gas can be redirected from the main flow direction 6 in the direction of the separation elements 8. The guide surfaces 61 of the vortex-generating apparatus part 1 are arranged within a tubular piece 62 upstream of the inner jacket surface 52 about a central axis 60 aligned in the main flow direction 6.

In accordance with the embodiment shown in FIG. 10, the guide surfaces 61 are fastened to a bar 63 which is arranged along the central axis 60. The guide surfaces 61 include an angle of inclination 64 with a plane which is aligned normally to the main flow direction 6, said angle of inclination being larger than 20° and smaller than 70°, preferably between 45° and 65°. The angle of inclination of a guide surface 61 can also be variable. The angle of inclination 64 can, for example, be smaller in a region of the tubular piece 62 close to the central axis, that is the guide surfaces 2 can be arranged flatter than in a region of the tubular piece 62 close to the wall.

In addition to the vortex generating apparatus part, further deflection elements 70 can be provided in the flow passage 5. Disk-shaped deflection elements 70 which serve for improving the flow guidance can in particular be arranged about the central axis 60 of the arrangement.

The invention claimed is:

1. A droplet separator comprising a flow passage configured to conduct a droplet charged gas to flow along a main flow direction, wherein a separation element is arranged in an annular shape about the flow passage, said separation element being able to be flowed through by an annular flow directed away from the flow passage, wherein the separation element has a base element and a top element as well as a plurality of connection elements which are arranged between the base element and the top element such that the base element and the top element are arranged at a spacing from one another which is defined by the plurality of connection elements, wherein the plurality of connection elements include a wall element configured to conduct droplets of the droplet charged gas as a film in a direction of the base element, wherein the wall element has a separation surface which has a mean width of more than 1 mm, wherein the separation element contains a ring element having a grid-like structure surrounding the flow passage as a ring-shaped element and having an inner wall surface, which has a diameter of the flow passage and inlet openings are foreseen for enabling the droplet charged gas to enter the ring element, and wherein the plurality of connection elements are arranged downstream of the ring element.

2. A droplet separator in accordance with claim 1, wherein the wall element has a hollow space in a range from 20 to 80%.

3. A droplet separator in accordance with claim 1, wherein a mean width of the wall element is smaller than an inner diameter (S) of the flow passage.

4. A droplet separator in accordance with claim 1, wherein the wall element is configured as a tubular wall element which has a longitudinal axis which is aligned normally to the base element and to the top element.

5. A droplet separator in accordance with claim 1, wherein the plurality of connection elements are arranged between the base element and the top element such that their longitudinal axes lie on a closed curve which extends around the flow passage and on which two respective adjacent connection elements are arranged equidistantly.

6. A droplet separator in accordance with claim 1, wherein the plurality of connection elements are arranged between the base element and the top element such that their longitudinal axes are arranged on a circle so that the longitudinal axes of the connection elements form at least one first and one second circle around the flow passage, wherein the first circle is arranged concentrically to the second circle.

7. A droplet separator in accordance with claim 6, wherein the longitudinal axes of the plurality of connection elements forming the first circle are arranged at least partly offset to the longitudinal axes of the connection elements of the second circle in a peripheral direction.

8. A droplet separator in accordance with claim 1, wherein a width and a height of a connection element of the plurality of connection elements forms a separation surface which has at least one planar section.

9. A droplet separator in accordance with claim 8, wherein the separation surface contains at least one passage and/or one opening for leading off liquid.

10. A droplet separator in accordance with claim 7, wherein the separation surface has at least one curved section, wherein where the curved section is configured as a tubular wall element, the tubular wall element comprises a first tubular wall element which has a first diameter (D1) and further comprises a second tubular wall element which has a second diameter (D2), wherein the first diameter (D1) of the first tubular wall element is optionally different than the second diameter (D2) of the second tubular wall element.

11. A droplet separator in accordance with claim 1, wherein a connection element of the plurality of connection elements contains a foot element and/or a head element by means of which the connection element can be fastened to the base element and/or to the top element.

12. A droplet separator in accordance with claim 8, wherein the separation surface is impermeable to fluids.

13. A droplet separator in accordance with claim 1, containing a plurality of separation elements arranged one above another.

14. A droplet separator in accordance with claim 1, wherein the separation element is configured as a one-piece component.

15. Use of a droplet separator in accordance with claim 1 for separating condensate from natural gas.

* * * * *